US012081928B2

(12) United States Patent
Eva et al.

(10) Patent No.: US 12,081,928 B2
(45) **Date of Patent: *Sep. 3, 2024**

(54) INGRESS RESISTANT PORTABLE SPEAKER

(71) Applicant: Bose Corporation, Framingham, MA (US)

(72) Inventors: Brenton Harry Eva, Fayette, ME (US); David J. Fustino, San Diego, CA (US); Steven A. Sliverstein, Marlborough, MA (US); Paul Robert Summerson, Leicester, MA (US); Annu Kuriakose, Waltham, MA (US)

(73) Assignee: Bose Corporation, Framingham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/135,312

(22) Filed: Apr. 17, 2023

(65) Prior Publication Data

US 2023/0254613 A1 Aug. 10, 2023

Related U.S. Application Data

(63) Continuation of application No. 17/481,820, filed on Sep. 22, 2021, now Pat. No. 11,683,621.

(51) Int. Cl.

| | |
|---|---|
| ***H04R 1/02*** | (2006.01) |
| ***H04R 1/28*** | (2006.01) |
| ***H04R 3/12*** | (2006.01) |

(52) U.S. Cl.

CPC ........... *H04R 1/023* (2013.01); *H04R 1/2811* (2013.01); *H04R 3/12* (2013.01); *H04R 2400/11* (2013.01); *H04R 2420/09* (2013.01)

(58) Field of Classification Search

CPC ... H04R 2400/11; H04R 3/12; H04R 2420/09
USPC .................................................... 381/74, 334
See application file for complete search history.

(56) References Cited

U.S. PATENT DOCUMENTS

| | | | | |
|---|---|---|---|---|
| 6,430,644 | B1 | 8/2002 | Luen | H05K 5/0256 361/726 |
| 8,855,351 | B2 * | 10/2014 | Alstad | H04R 1/1033 381/376 |
| 9,185,478 | B2 | 11/2015 | Minarik | H04R 1/023 |
| 9,604,325 | B2 * | 3/2017 | Wenzel | H04R 25/604 |
| 10,327,054 | B2 | 6/2019 | Lupfer | H04R 1/02 |
| 10,582,283 | B1 * | 3/2020 | Yin | F21V 33/0056 |
| 10,595,105 | B2 | 3/2020 | Amae | B29C 45/1671 |
| 10,994,190 | B2 | 5/2021 | Bluhm | A63C 17/12 |
| 11,006,194 | B2 * | 5/2021 | Nakatsukasa | H04R 1/023 |
| 11,116,448 | B1 * | 9/2021 | Trapero Martin | A61B 5/0816 |

(Continued)

OTHER PUBLICATIONS

PCT International Search Report and Written Opinion for International Application No. PCT/US2022/044065, dated Jan. 30, 2023, 13 pages.

(Continued)

*Primary Examiner* — Disler Paul
(74) *Attorney, Agent, or Firm* — Hoffman Warnick LLC

(57) ABSTRACT

Various implementations include portable loudspeakers. Certain implementations include a portable loudspeaker that mitigates ingress of moisture, particulates, and other contaminates. In particular implementations, the portable loudspeaker includes a housing with an enclosure having a co-molded construction for ingress resistance.

19 Claims, 8 Drawing Sheets

(56) References Cited

U.S. PATENT DOCUMENTS

| | | | | |
|---|---|---|---|---|
| 11,277,678 | B2 | 3/2022 | Eva | H04R 1/025 |
| 11,285,885 | B1 * | 3/2022 | Jordan | F21V 33/0056 |
| 2007/0047753 | A1 * | 3/2007 | Watson | H04B 1/3805<br>381/365 |
| 2007/0076712 | A1 * | 4/2007 | Pope | H04L 45/742<br>370/389 |
| 2014/0029782 | A1 | 1/2014 | Rayner | |
| 2014/0355806 | A1 * | 12/2014 | Graff | H04R 1/2834<br>381/334 |
| 2015/0096828 | A1 | 4/2015 | Fathollahi | |
| 2021/0168489 | A1 * | 6/2021 | Zhang | H04R 1/1075 |
| 2021/0235931 | A1 | 8/2021 | Souris | A47J 41/0094 |
| 2022/0030341 | A1 | 1/2022 | Chng | H04R 1/08 |

OTHER PUBLICATIONS

Panoryios et al, "Anker Soundcore Motion+ Speaker Review," Feb. 10, 2021, 12 pages.

* cited by examiner

INGRESS RESISTANT PORTABLE SPEAKER

PRIORITY CLAIM

This application is a continuation of, and claims priority to, U.S. patent application Ser. No. 17/481,820 (filed Sep. 22, 2021), the entire contents of which are incorporated by reference herein.

TECHNICAL FIELD

This disclosure generally relates to audio devices. More particularly, the disclosure relates to a portable speaker that is resistant to ingress of solid particles and liquids.

BACKGROUND

There is a growing demand for audio devices, such as portable audio devices, with increased capabilities and durability. However, it can be challenging to accommodate high performance acoustic components in a portable audio device that is both rugged and compact. Additionally, it is difficult to design environmental protection for many portable devices without sacrificing one or more performance capabilities.

SUMMARY

All examples and features mentioned below can be combined in any technically possible way.

Various implementations include portable loudspeakers. Certain implementations include a portable loudspeaker that is resistant to ingress of moisture, particulates, and other contaminates. In particular implementations, the portable loudspeaker includes a housing with an enclosure having a co-molded construction for ingress resistance.

In particular aspects, a portable loudspeaker includes: a housing having: a front grille; and a rear enclosure coupled with the front grille, the rear enclosure comprising a co-molded construction having a rigid core and a compliant cover over the rigid core, the rear enclosure defining a rear grille opposing the front grille; and an electro-acoustic transducer contained in the housing for providing an acoustic output.

In further aspects, a portable loudspeaker includes: a housing having: a front grille; and a rear enclosure coupled with the front grille, the rear enclosure having a co-molded construction having a rigid core and a compliant cover over the rigid core, the rear enclosure defining a rear grille opposing the front grille, wherein the rear enclosure further comprises a set of feet for stabilizing the portable loudspeaker on a surface; and an electro-acoustic transducer contained in the housing for providing an acoustic output, where the electro-acoustic transducer is positioned off-center relative to a lateral centerline of the housing, wherein the set of feet mitigate rocking of the portable loudspeaker while the electro-acoustic transducer provides the audio output.

In additional aspects, a portable loudspeaker includes: a housing having: a front grille; a rear enclosure coupled with the front grille, the rear enclosure including a co-molded construction having a rigid core and a compliant cover over the rigid core, the rear enclosure defining a rear grille opposing the front grille; and a single printed circuit board (PCB) within the rear enclosure; and an electro-acoustic transducer contained in the housing for providing an acoustic output, wherein the single PCB controls operation of the electro-acoustic transducer and interface buttons located on the housing.

In certain additional aspects, a portable loudspeaker includes: a housing including: a front grille; and a rear enclosure coupled with the front grille, the rear enclosure comprising a co-molded construction having a rigid core and a compliant cover over the rigid core, the rear enclosure defining a rear grille opposing the front grille, where the compliant cover fits over the core in a compliant manner to seal against all contact surfaces of the core; and an electro-acoustic transducer contained in the housing for providing an acoustic output.

Implementations may include one of the following features, or any combination thereof.

In certain examples, the rigid core has a first hardness and the compliant cover has a second hardness that is less than the first hardness.

In some cases, the rear enclosure further includes a set of feet for stabilizing the portable loudspeaker on a surface.

In particular aspects, the rear enclosure is contoured such that when placed upright on a surface, the contour defines a contact region that rests on the surface, and where the contact region and the set of feet provide at least four points of contact with the surface for stabilizing the portable loudspeaker while providing the acoustic output.

In certain implementations, the set of feet includes at least four feet arranged in a trapezoidal shape.

In particular aspects, the electro-acoustic transducer is positioned off-center relative to a lateral centerline of the housing, where the set of feet mitigate rocking of the portable loudspeaker while the electro-acoustic transducer provides the audio output.

In some cases, the rigid core includes a plastic or a polycarbonate resin, and the compliant cover includes silicone.

In certain implementations, at least one of the rigid core or the compliant cover is formed of multiple sub-layers of material.

In particular aspects, the rear grille is defined by the rigid core.

In certain cases, the rear grille is a portion of the rigid core not covered by the compliant cover.

In some implementations, the loudspeaker further includes a baffle positioned between the rear enclosure and the front grille.

In certain aspects, the baffle includes an opening for the electro-acoustic transducer, and the electro-acoustic transducer is mounted to the baffle. In particular cases, a gasket is positioned to seal the transducer to the baffle.

In particular cases, the loudspeaker further includes at least one passive radiator positioned between the baffle and the rear enclosure, where the baffle includes an opening aligned with a first side of the passive radiator, and the rear grille is aligned with a second side of the passive radiator.

In particular cases, the at least one passive radiator includes a set of two passive radiators that are centered relative to one another.

In some implementations, at least one of the passive radiators is mounted to the baffle proximate the opening.

In particular aspects, the rear enclosure includes a housing for the passive radiator. In certain cases, the passive radiator has an integrated seal.

In certain cases, the loudspeaker further includes a battery and a wrapping directly covering the battery that enhances a fire rating of the portable loudspeaker.

In some aspects, the co-molded construction of the rear enclosure provides the portable loudspeaker with an ingress protection (IP) rating of at least IP67.

In particular cases, a maximum excursion of the electro-acoustic transducer occupies approximately 90 percent or more of a depth of the housing.

In certain implementations, the maximum excursion of the electro-acoustic transducer occupies approximately 95 percent or more of the depth of the housing.

In some aspects, the loudspeaker further includes a USB-C connector accessible through the housing, where the co-molded construction of the housing environmentally seals the USB-C connector.

In particular cases, the loudspeaker further includes a single printed circuit board (PCB) within the rear enclosure, where the single PCB controls operation of the electro-acoustic transducer and interface buttons located on the housing.

In some aspects, the single PCB includes an opening for accommodating the electro-acoustic transducer.

In certain implementations, the PCB has a longitudinal dimension spanning at least approximately 75 percent of a longest dimension of the housing.

In particular cases, the rear enclosure defines a rear of the portable loudspeaker and approximately an entirety of side-walls of the portable loudspeaker.

In some aspects, the loudspeaker further includes a mounting strap extending through the rear enclosure, where the compliant cover provides an environmental seal around the mounting strap.

In particular implementations, rear enclosure includes an internal well that is potted with a cap and an adhesive to aid in environmentally sealing the mounting strap.

Two or more features described in this disclosure, including those described in this summary section, may be combined to form implementations not specifically described herein.

The details of one or more implementations are set forth in the accompanying drawings and the description below. Other features, objects and benefits will be apparent from the description and drawings, and from the claims.

Figure 1:
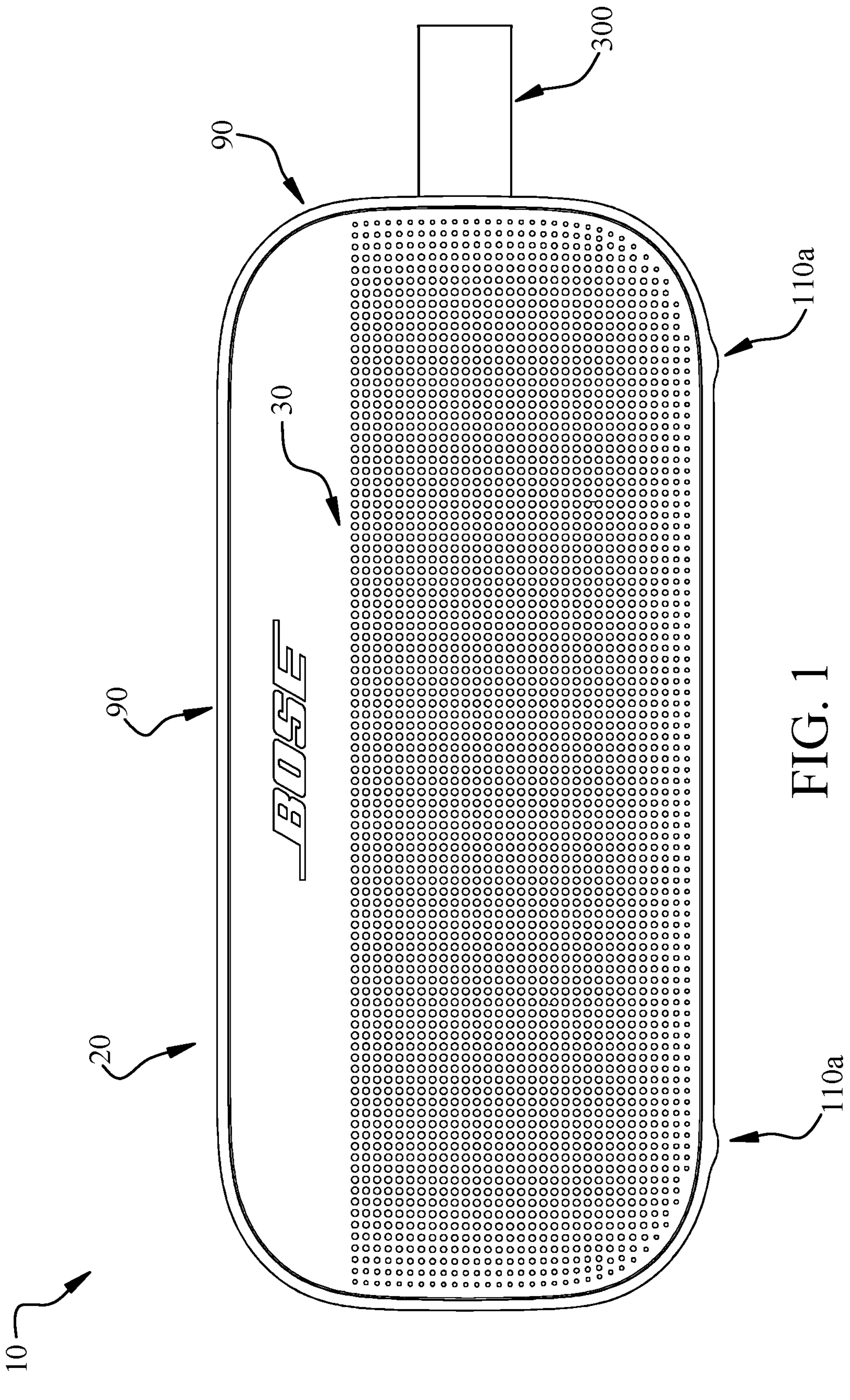
FIG. 1 shows a front view of an audio device in a forward-firing orientation according to various implementations.

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

DETAILED DESCRIPTION

This disclosure provides, at least in part, a portable loudspeaker that beneficially incorporates a rear enclosure with a co-molded construction to enhance manufacturability, improve durability (or, ruggedness) and enhance resistance to ingress. This disclosure is also based, at least in part, on the realization that the co-molded construction can include a rigid core and a compliant cover over the rigid core, providing a durable, effective seal over internal components in the portable loudspeaker. The rigid core has a first hardness, and the compliant cover has a second hardness, where the first hardness is greater than the second hardness. In certain cases, the portable loudspeaker is compact in addition to being durable and ingress resistant. For example, the electro-acoustic transducer in the portable loudspeaker can have a maximum excursion that occupies approximately 90 percent or more of the depth of the speaker housing. The portable loudspeaker can also operate both the electro-acoustic transducer and interface buttons with a single printed circuit board (PCB).

Commonly labeled components in the FIGURES are considered to be substantially equivalent components for the purposes of illustration, and redundant discussion of those components is omitted for clarity.

As users demand increasing functionality from their portable electronic devices, it becomes more difficult to design and manufacture such devices to satisfy acoustic output standards while maintaining portability, durability, battery life, and protection from the elements (e.g., ingress protection). Additionally, as noted herein, it is difficult to design environmental and impact protection for many portable devices without sacrificing one or more performance capabilities. In contrast to conventional audio devices, various implementations include a portable loudspeaker with a housing that includes a co-molded rear enclosure with a rigid core and a compliant cover. The rear enclosure seats a majority of the internal electronics and the co-molded construction provides both durability and ingress protection. Additionally, in contrast to conventional audio devices, various implementations include a portable loudspeaker with an electro-acoustic transducer having a maximum excursion that occupies approximately 90 percent or more of a depth of the housing, enabling high-quality audio output in a compact form factor.

Figure 2:
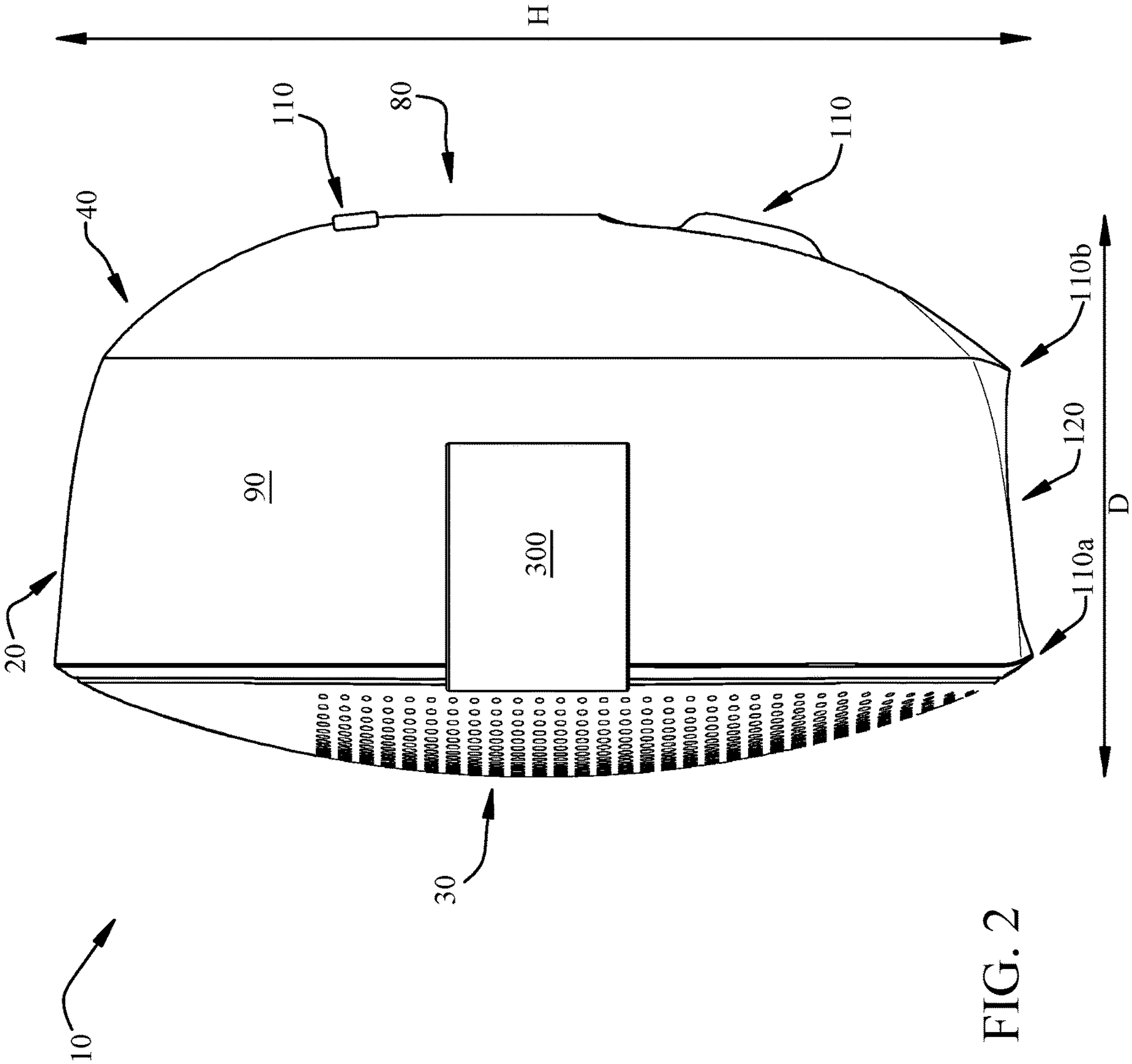
FIG. 2 shows a side view of the audio device of FIG. 1 in the forward-firing orientation, according to various implementations.
Figure 3:
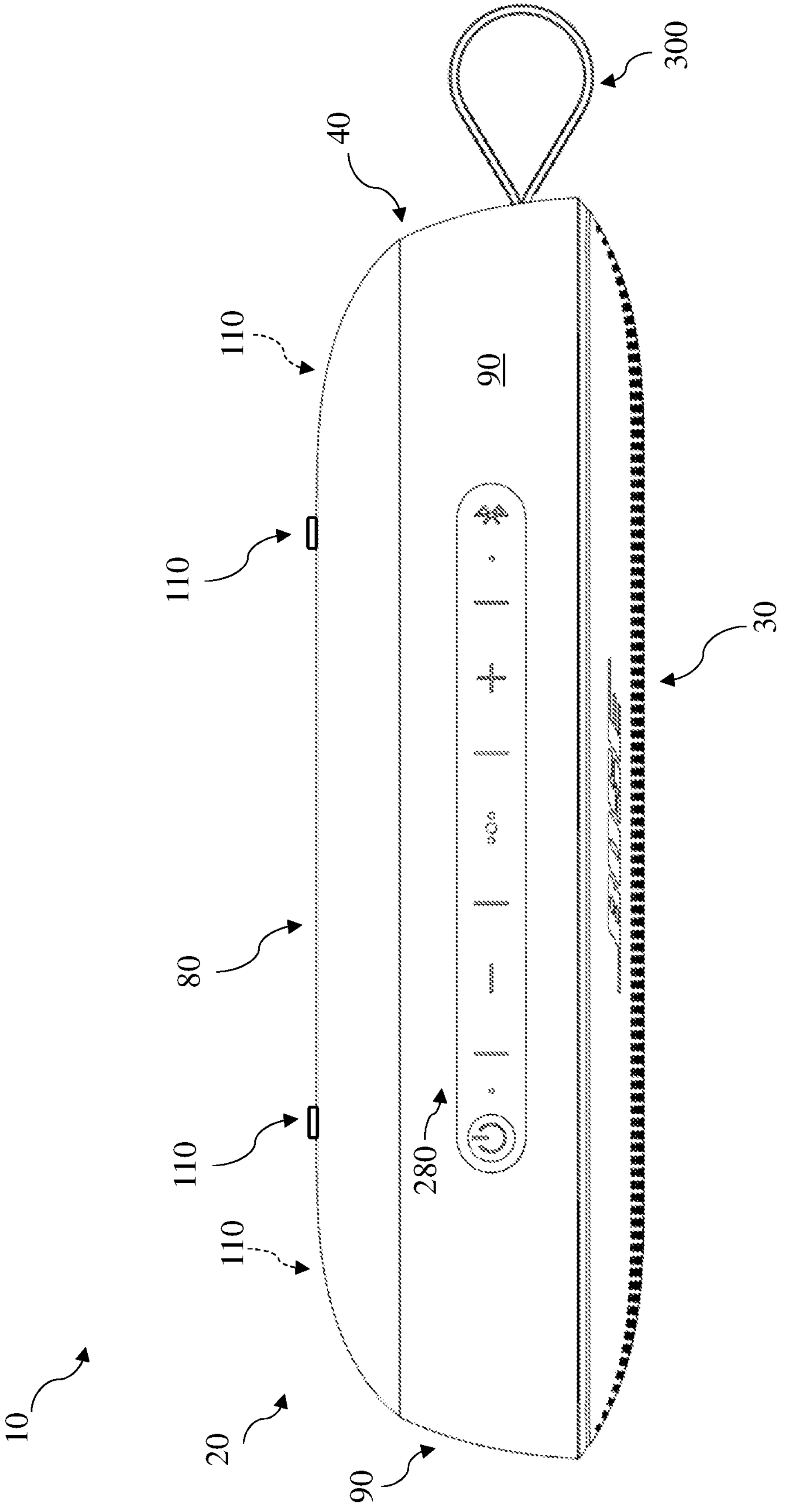
FIG. 3 shows a top view of the audio device of FIGS. 1 and 2, according to various implementations.
Figure 4:
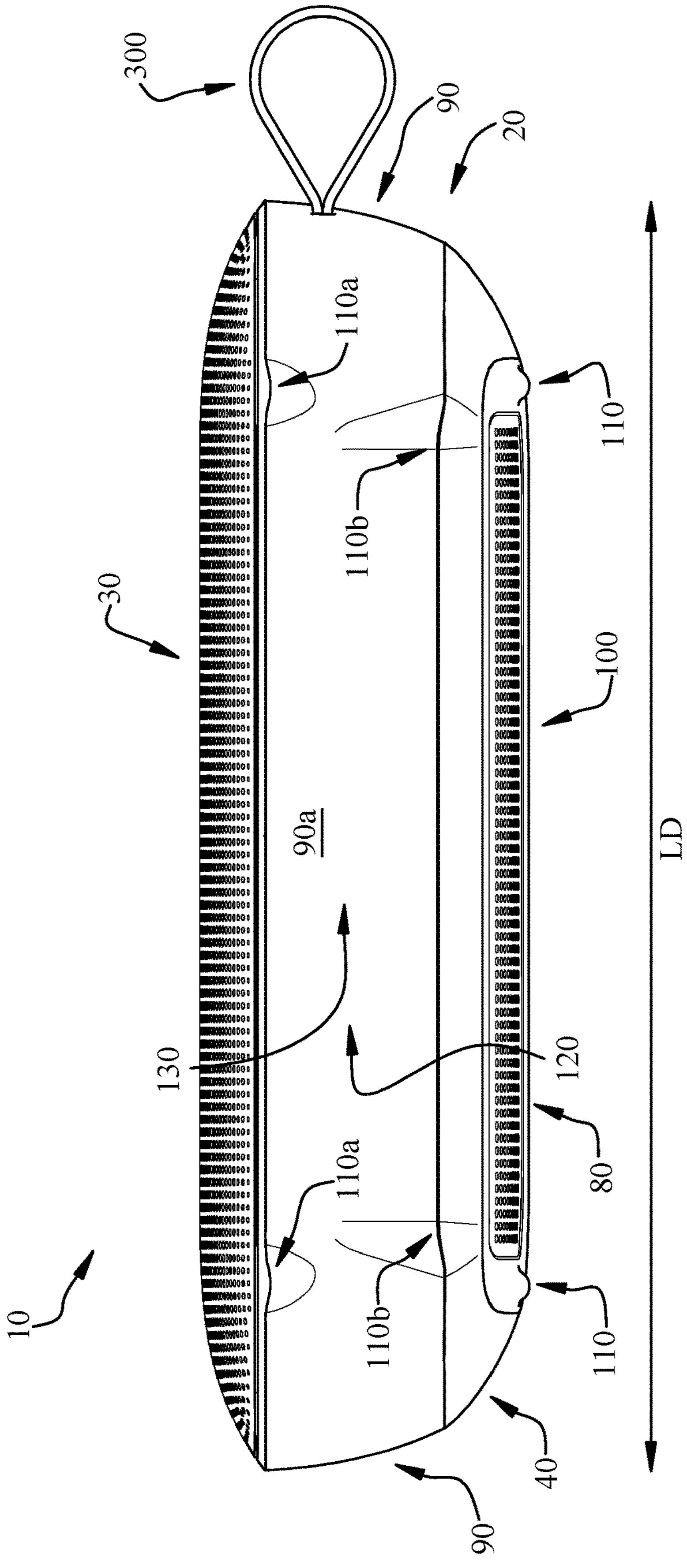
FIG. 4 shows a side view of an audio device in an upward firing (or up-firing) position according to various implementations.
Figure 5:
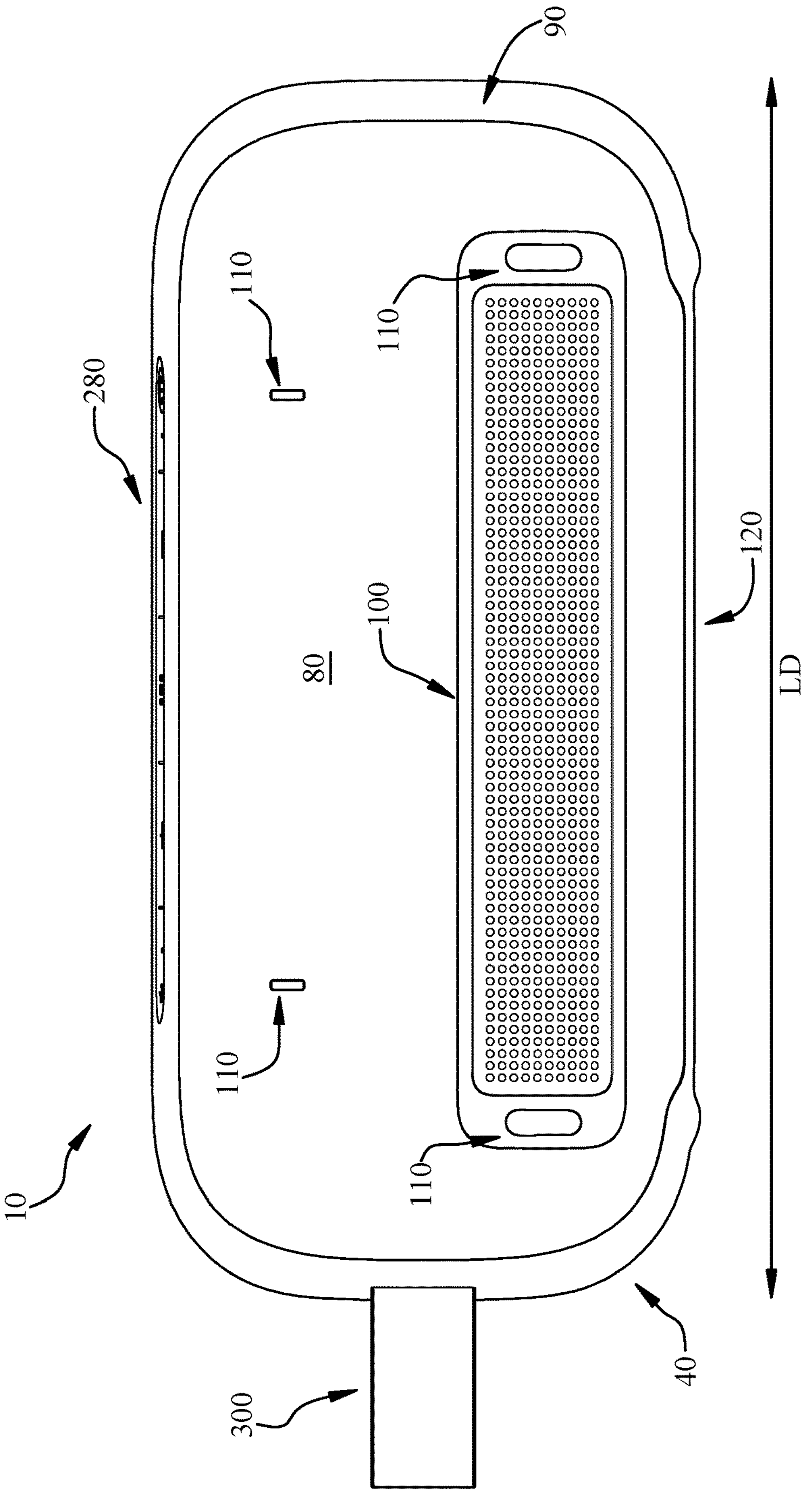
FIG. 5 shows a rear view of an audio device in a forward firing position according to various implementations.
Figure 6:
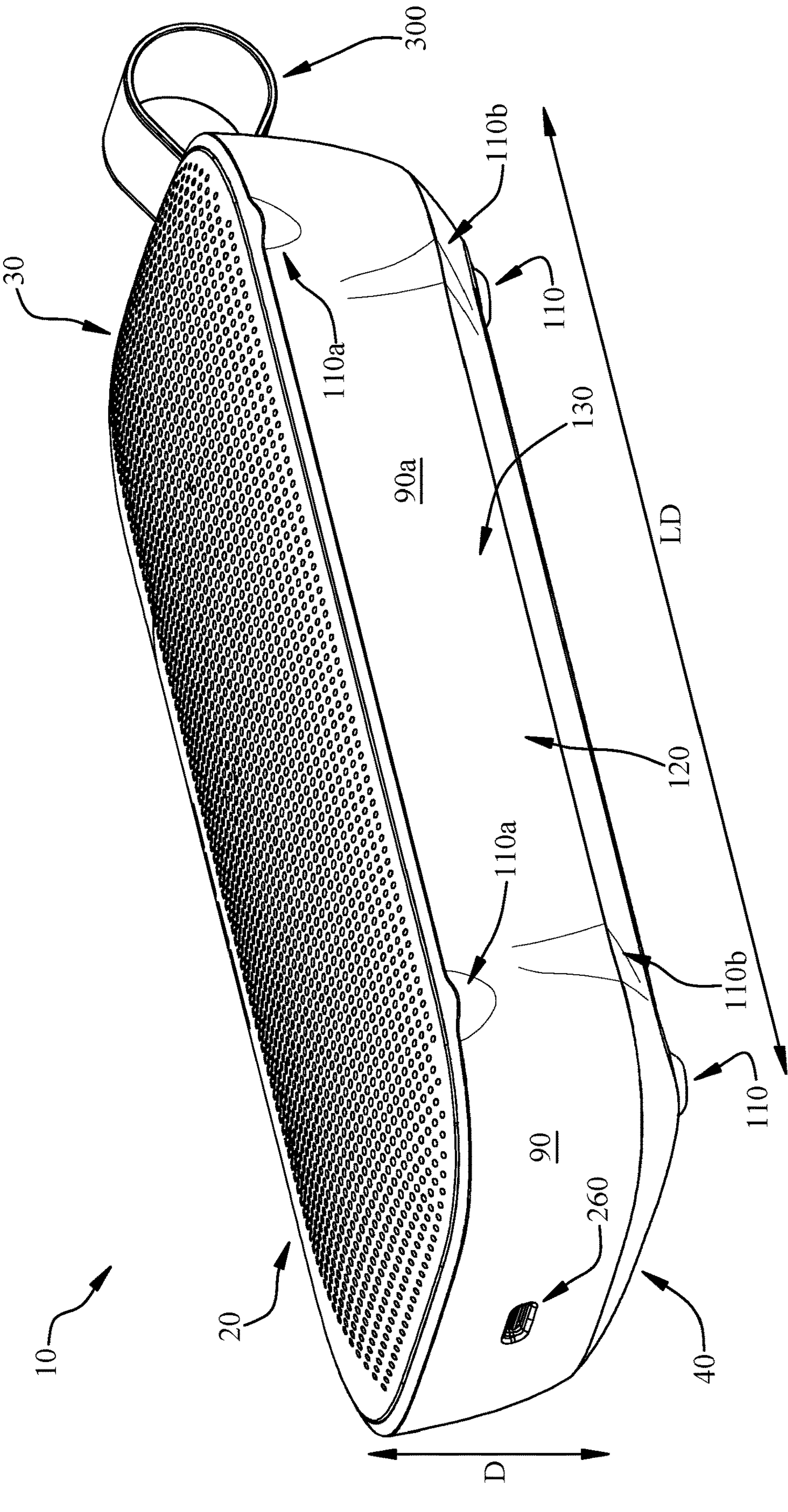
FIG. 6 shows a three-dimensional perspective view of the audio device of FIG. 4 in the upward firing position according to various implementations.
Figure 7:
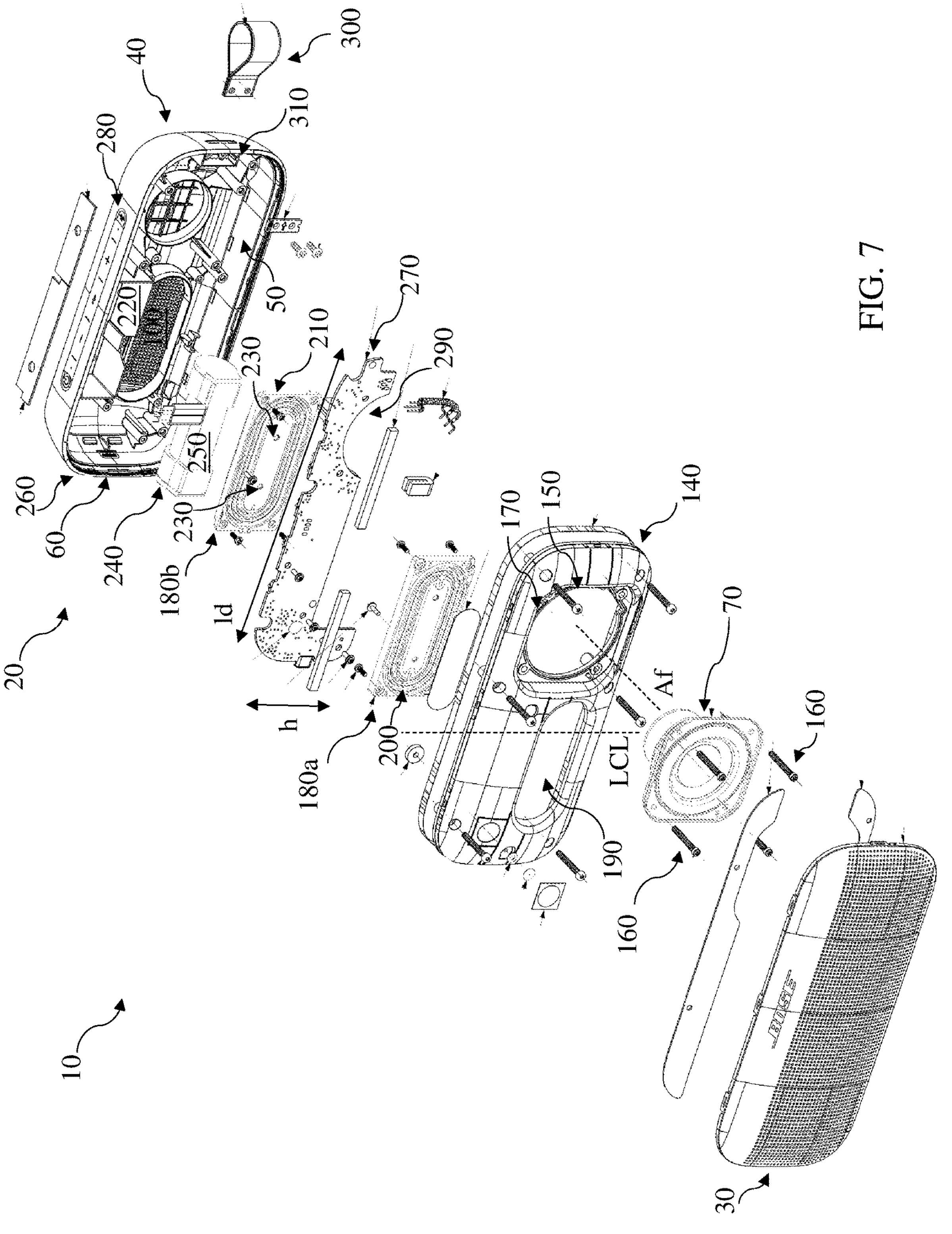
FIG. 7 shows an exploded perspective view of portions of an audio device according to various implementations.

FIG. 1 shows a front view of an audio device 10 in an upright standing position (also called forward firing position) according to various implementations. FIG. 2 shows a side view of the audio device 10 in the upright standing position. FIG. 3 shows a top view of the audio device 10 in the upright standing position, while FIG. 4 shows a side view of the audio device 10 in a laying position (also called an upward firing position). FIG. 5 shows a rear view of the audio device 10 in the forward firing position. FIG. 6 is a perspective view of the audio device 10 in the upward firing (e.g., laying) position. FIG. 7 is an exploded view of the audio device 10 in FIGS. 1-6, illustrating various internal features of the device. FIGS. 1-7 are referred to collectively except where specifically noted, and FIG. 7 is referred to with most frequency throughout the following description. In some cases, the audio device 10 includes a portable loudspeaker such as a tabletop, mounted (or suspended), or handheld speaker. As described herein and illustrated in the distinct views of the audio device 10, the portable loudspeaker can be configured to operate (i.e., output audio) in distinct orientations and/or physical configurations, e.g., resting on a side, resting on a back, resting on one or more feet, mounted or otherwise retained via a mounting strap, etc.

Turning to the FIGURES, with particular attention to FIG. 7, the audio device 10 includes a housing 20 having a front grille 30 and a rear enclosure 40 coupled with the front grille 30. In various implementations, the rear enclosure 40 has a co-molded construction, as illustrated in the front view of the rear enclosure 40 in FIG. 8 (with grille 30 removed). That is, the rear enclosure 40 has a rigid (or, semi-rigid) core 50 and a compliant cover 60 over the rigid (or semi-rigid) core 50. In various implementations, the terms "rigid" and "compliant" are intended to convey relative distinctions in hardness, such that the core 50 has a first hardness and the cover 60 has a second hardness that is less than the first hardness. In certain cases, the first hardness does not require absolute rigidity, but rather, a significant difference from the second hardness. For example, the compliant cover 60 can have a Shore A hardness of approximately 50 or less, while the core 50 is significantly harder than the compliant cover 60. In certain cases, the core 50 is harder than the cover 60 (e.g., on a Shore scale or any other conventional hardness scale) by at least 15 percent, at least 20 percent, at least 25 percent, at least 30 percent, at least 35 percent, at least 40 percent, at least 45 percent, or at least 50 percent. In particular cases, the core 50 is at least 60 percent, 70 percent, or 80 percent harder than the cover 60. As described herein, the cover 60 is configured to fit over the core 50 in a compliant manner, e.g., sealing against all contact surfaces of the core 50. Additionally, the cover 60 can provide impact protection for components in the housing 20, e.g., one or more transducers, microphones, passive radiators, control circuitry (e.g., printed circuit board(s), or PCBs), etc.

In particular examples, the core 50 includes a plastic or a polycarbonate resin. In certain examples, the cover 60 includes silicone. In particular examples where the cover 60 includes silicone, the silicone can include liquid silicone rubber (LSR). In certain implementations, the core 50 and/or the cover 60 is formed of multiple sub-layers of material. For example, the cover 60 is formed of two or more sub-layers of material in particular implementations, e.g., a finish can be applied to the primary layer of silicone of the cover 60 after the molding process. The finish can aid in laser etching and/or enhance the cosmetic appearance of the cover 60.

As noted herein, the co-molded construction of the rear enclosure 40 can provide the audio device 10 with an ingress protection (IP) rating of at least IP67 (as defined by International Protection Marking standards set forth by the International Electrotechnical Commission (IEC)). In certain cases, this co-molded construction of the rear enclosure 40 can provide an IP rating of at least IP68.

Figure 8:
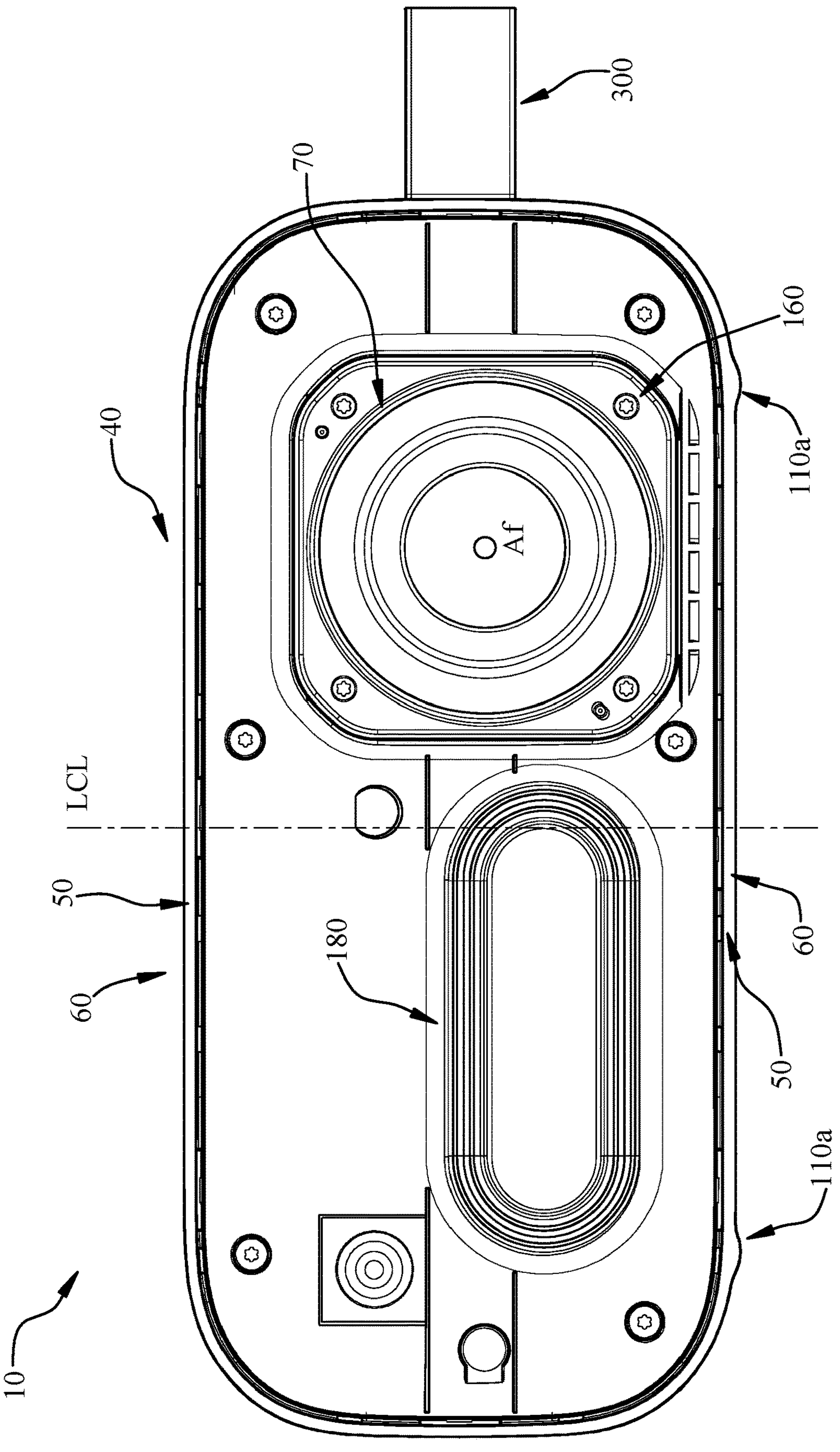
FIG. 8 shows a front cross-sectional view of portions of an audio device according to various implementations.

With continuing reference to FIGS. 7 and 8, an electro-acoustic transducer (or "transducer") 70 is contained in the housing 20 for providing an acoustic output. As described herein, the transducer 70 can be positioned to enhance acoustic output within a housing 20 that is portable and easily repositioned by a user.

In certain implementations, as illustrated in FIG. 7 and also evident in FIGS. 2 and 6, the rear enclosure 40 defines a rear 80 of the audio device 10 (or, portable loudspeaker) and approximately an entirety of sidewalls 90 of the audio device 10. That is, the rear enclosure 40 wraps around a number of the electronics in the housing 20, such that in the upward firing orientation (e.g., FIG. 6), the vast majority of the electronics in the housing 20 are at least partially surrounded by the rear 80 and sidewalls 90 of the rear enclosure 40.

In various implementations, the rear enclosure 40 defines a rear grille 100 (FIG. 4, FIG. 7) opposing the front grille 30. That is, in various implementations, the rear grille 100 is defined by the core 50, such that the rear grille 100 is a portion of the core 50 that is not covered by the compliant cover 60. In these cases, the rear grille 100 includes a set of apertures enabling audio output therethrough, and is surrounded by the core 50 that is enveloped in the compliant cover 60.

In certain cases, the rear enclosure 40 includes a set of feet 110 along one of the sidewalls 90*a* for stabilizing the audio device 10 on a surface (e.g., FIGS. 1, 2, and 6), e.g., a tabletop, step, floor, truck bed, etc. While the term sidewall is used to describe sidewall 90*a*, it is understood that this side of the audio device 10 can also be considered its bottom, or base, in the forward-firing orientation illustrated in FIGS. 1 and 2. In particular implementations, the feet 110 includes at least two feet 110*a* arranged along the length of the rear enclosure 40. With reference to FIGS. 2, 4 and 7, in some cases, an outer surface 120 of the rear enclosure 40, e.g., along sidewall 90*a*, is contoured such that when placed upright on a surface (e.g., tabletop, floor, etc.), the contour defines a contact region 130 that rests on the surface. In some of these cases, the contact region 130 and the set of feet 110 provide at least four points of contact with the surface for stabilizing the portable loudspeaker while providing the acoustic output. In particular aspects, the set of feet 110 includes two distinct sets of two feet 110*a*, 110*b* (FIG. 2, FIG. 4, FIG. 6), totaling four (4) total feet along the sidewall 90*a*. In a certain example, as shown in FIG. 4, the feet 110*a*, 110*b* are arranged in a trapezoidal shape along the sidewall 90*a*.

Turning to FIGS. 7 and 8, in various implementations, the audio device 10 includes the transducer 70 that is positioned off-center relative to a lateral centerline (LCL) of the housing 20. That is, the transducer 70 has a firing axis (Af) that is not aligned with the LCL, and is laterally off-set relative to the LCL. In some cases, the set of feet 110 mitigate rocking of the audio device 10 while the transducer 70 provides audio output. The feet 110 along sidewall 90*a* may be particularly well suited to mitigate rocking while the audio device 10 is in the forward-firing orientation (e.g., in FIGS. 1, 2 and 8). In these cases, the feet 110 may provide sufficient (e.g., frictional) force against the resting surface to counteract the force from the motion of the transducer 70.

FIGS. 7 and 8 further illustrate an additional feature of the audio device 10 according to various implementations. In these configurations, the audio device 10 further includes a baffle 140 positioned between the rear enclosure 40 and the front grille 30. In particular cases, the baffle 140 includes an opening 150 for the transducer 70. According to some implementations, the transducer 70 is mounted to the baffle 140, e.g., with a set of fasteners 160 (four shown for illustrative purposes). In certain cases, fasteners 160 can include threaded fasteners such as screws, bolts, clips, pins, or any other suitable fastening mechanism for retaining the transducer 70 within the baffle 140 during use of the audio device 10. In particular cases, the fasteners extend through the baffle 140 and couple with corresponding openings, or slots, in the rear enclosure 40. A gasket 170 is positioned on the transducer 70 to seal the transducer 70 to the baffle 140 in particular cases.

In some cases, as can be seen, e.g., in FIGS. 2, 5 and 6, the transducer 70 is configured to span a majority of the depth (D) of the housing 20 (FIG. 2) while in use, e.g., to provide a desirable range of audio output. In some example cases, a maximum excursion (e.g., front to back limit during use) of the transducer 70 occupies approximately 90 percent or more of the depth (D) of the housing 20. In more particular examples, the maximum excursion of the transducer 70 occupies approximately 95 percent or more of the depth (D) of the housing 20.

With continuing reference to FIGS. 6 and 7, the audio device 10 can further include at least one passive radiator 180 positioned between the baffle 140 and the rear enclosure 40. In some of these cases, a set of two passive radiators 180*a*, 180*b* are provided, and are centered relative to one another. In particular aspects, the baffle 140 includes an opening 190 aligned with a first side 200 of the passive radiator 180*a*. In particular aspects, the rear grille 100 is aligned with a second side 210 of the passive radiator 180*b*, such that a portion of the acoustic output from the passive radiators 180*a*, 180*b* is directed outward through the rear grille 100. According to some implementations, passive radiator 180*a* is mounted to the baffle 140 proximate to the opening 190. In particular aspects, the rear enclosure 40 includes a housing 220 for the passive radiators 180*a*, 180*b*, such that the radiators 180 are integrated into the rear enclosure 40. In these cases, the housing 220 can include a set of one or more walls, protrusions, or tabs for seating the passive radiators 180*a*, 180*b*. According to particular implementations, the housing 220 is annular and surrounds at least a portion of the passive radiators 180*a*, 180*b*. In certain cases, at least one of the passive radiators 180*a*, 180*b* has an integrated seal for sealing within the housing 220. Additionally, a set of fasteners 230 can be located internal to the passive radiator 180*b* for sealing the passive radiator 180*b* to the rear enclosure 40.

Returning to FIG. 6, in some cases, the audio device 10 further includes a battery 240 and a wrapping 250 directly covering the battery 240. In various implementations, the wrapping 250 aids in controlling the risk of fire from a malfunction of the battery 240, and enhances a fire rating of the audio device 10.

FIGS. 5 and 6 illustrate additional aspects of the audio device 10, including, for example, a USB-C connector 260 that is accessible through the housing 20 (e.g., via a sidewall 90 defined by the rear enclosure 40). In various implementations, the co-molded construction of the rear enclosure 40 environmentally seals the USB-C connector 260, mitigating ingress of environmental contaminates and enhancing the durability of the connector 260 and its associated functionality.

Turning to FIG. 6, in various implementations the audio device 10 also includes a single printed circuit board (PCB) 270 within the rear enclosure 40. In these cases, the single PCB 270 is configured to control operation of both the transducer 70 and interface buttons 280 (FIG. 3, FIG. 6) located on the housing 20. That is, the single PCB 270 provides a compact, energy-efficient mechanism for controlling the audio output at the audio device 10 along with interface functionality. In certain implementations, the PCB 270 includes one or more digital signal processors (DSPs) and related control circuitry for the transducer 70. In particular cases, the PCB 270 includes an opening 290 for accommodating the transducer 70. In certain aspects, the PCB 270 spans longitudinally across the audio device 10 (e.g., within rear enclosure 40). For example, the PCB 270 can have a longitudinal dimension (ld) spanning at least approximately 75 percent of the longest dimension (LD) of the housing 20. In further examples, the PCB 270 can span at least 85 percent, 90 percent or 95 percent of the LD of the housing 20. In additional implementations, a height (h) the PCB 270 can span up to 65 percent, 75 percent, or 85 percent of the vertical height (H) of the housing 20 in the upright position (FIG. 2).

FIGS. 1-7 illustrate an additional feature of the audio device 10 according to implementations, which can include a mounting strap 300 extending through the rear enclosure 40. As illustrated in FIG. 6, the compliant nature of the cover 60 can provide an environmental seal around the mounting strap 300, e.g., to limit ingress of environmental contamination. In certain cases, the rear enclosure 40 includes a pocket 310, which can include a cap and an adhesive, for further sealing the mounting strap 300 from a remainder of the electronics in the audio device 10 (FIG. 6).

As noted herein, the audio devices 10 disclosed according to various implementations provide numerous benefits relative to conventional audio devices. For example, relative to conventional audio devices, the co-molded construction of the rear enclosure 40 is more consistently manufacturable. Additionally, the co-molded construction of the rear enclosure 40 and the integral nature of the rear and the sidewalls improves durability (or, ruggedness) and enhance resistance to ingress (e.g., of moisture, particulates, etc.). In various implementations, as noted herein, the audio device 10 is compact in addition to being durable and ingress resistant. For example, the audio device 10 is configured such that the transducer 70 has a maximum excursion that occupies a significant majority of the depth of the housing 20, e.g., approximately 90 percent or more of the depth of the speaker housing in certain cases. At least some of the compact nature of the audio device 10 is enabled by a single PCB that can operate both the electro-acoustic transducer and interface buttons.

It is understood that the relative proportions, sizes and shapes of the audio device 10 and components and features thereof as shown in the FIGURES included herein can be merely illustrative of such physical attributes of these components. That is, these proportions, shapes and sizes can be modified according to various implementations to fit a variety of products. For example, while a substantially block (or rectangular cross-sectional) shaped loudspeaker may be shown according to particular implementations, it is understood that the loudspeaker could also take on other three-dimensional shapes in order to provide acoustic functions described herein.

In various implementations, components described as being "coupled" to one another can be joined along one or more interfaces. In some implementations, these interfaces can include junctions between distinct components, and in other cases, these interfaces can include a solidly and/or integrally formed interconnection. That is, in some cases, components that are "coupled" to one another can be simultaneously formed to define a single continuous member. However, in other implementations, these coupled components can be formed as separate members and be subsequently joined through known processes (e.g., soldering, fastening, ultrasonic welding, bonding). In various implementations, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

A number of implementations have been described. Nevertheless, it will be understood that additional modifications may be made without departing from the scope of the inventive concepts described herein, and, accordingly, other implementations are within the scope of the following claims.

We claim:

1. A portable loudspeaker, comprising:
a housing comprising:
a front grille; and
a rear enclosure coupled with the front grille, the rear enclosure comprising a co-molded construction having a rigid core and a compliant cover over the rigid core, the rear enclosure defining a rear grille opposing the front grille, wherein the rear enclosure further comprises a set of feet for stabilizing the portable loudspeaker on a surface; and
an electro-acoustic transducer contained in the housing for providing an acoustic output,
wherein the electro-acoustic transducer is positioned off-center relative to a lateral centerline of the housing, wherein the set of feet mitigate rocking of the portable loudspeaker while the electro-acoustic transducer provides the audio output.

2. The portable loudspeaker of claim 1, wherein the rear enclosure is contoured such that when placed upright on a surface, the contour defines a contact region that rests on the surface, and wherein the contact region and the set of feet provide at least four points of contact with the surface for stabilizing the portable loudspeaker while providing the acoustic output.

3. The portable loudspeaker of claim 1, wherein the set of feet comprises at least four feet arranged in a trapezoidal shape.

4. The portable loudspeaker of claim 1, wherein the rigid core comprises a plastic or a polycarbonate resin, and wherein the compliant cover comprises silicone.

5. The portable loudspeaker of claim 1, wherein at least one of the rigid core or the compliant cover is formed of multiple sub-layers of material.

6. The portable loudspeaker of claim 1, wherein the rear grille is defined by the rigid core, wherein the rear grille is a portion of the rigid core not covered by the compliant cover.

7. The portable loudspeaker of claim 1, further comprising a baffle positioned between the rear enclosure and the front grille.

8. The portable loudspeaker of claim 7, wherein the baffle comprises an opening for the electro-acoustic transducer, and wherein the electro-acoustic transducer is mounted to the baffle.

9. The portable loudspeaker of claim 7, further comprising a set of passive radiators positioned between the baffle and the rear enclosure, wherein the baffle comprises an opening aligned with a first side of one of the passive radiators, wherein the rear grille is aligned with a second side of another one of the passive radiators, wherein the passive radiator is mounted to the baffle proximate the opening, and wherein the rear enclosure comprises a housing for the passive radiator.

10. The portable loudspeaker of claim 1, further comprising a battery and a wrapping directly covering the battery that enhances a fire rating of the portable loudspeaker.

11. The portable loudspeaker of claim 1, wherein the co-molded construction of the rear enclosure provides the portable loudspeaker with an ingress protection (IP) rating of at least IP67.

12. The portable loudspeaker of claim 1, wherein a maximum excursion of the electro-acoustic transducer occupies approximately 90 percent or more of a depth of the housing.

13. A portable loudspeaker, comprising:
a housing comprising:
a front grille;
a rear enclosure coupled with the front grille, the rear enclosure comprising a co-molded construction having a rigid core and a compliant cover over the rigid core, the rear enclosure defining a rear grille opposing the front grille; and
a single printed circuit board (PCB) within the rear enclosure; and
an electro-acoustic transducer contained in the housing for providing an acoustic output, wherein the single PCB controls operation of the electro-acoustic transducer and interface buttons located on the housing,
wherein the rear enclosure defines a rear of the portable loudspeaker and approximately an entirety of sidewalls of the portable loudspeaker, and wherein the electro-acoustic transducer is positioned off-center relative to a lateral centerline of the housing.

14. The portable loudspeaker of claim 13, wherein the single PCB comprises an opening for accommodating the electro-acoustic transducer.

15. The portable loudspeaker of claim 13, wherein the PCB has a longitudinal dimension spanning at least approximately 75 percent of a longest dimension of the housing, wherein the PCB has a height spanning at least approximately 65 percent of a vertical height of the housing, and wherein the electro-acoustic transducer has a maximum excursion that occupies at least approximately 90 percent of a depth of the housing.

16. A portable loudspeaker, comprising:
a housing comprising:
a front grille;
a rear enclosure coupled with the front grille, the rear enclosure comprising a co-molded construction having a rigid core and a compliant cover over the rigid core, the rear enclosure defining a rear grille opposing the front grille; and
a single printed circuit board (PCB) within the rear enclosure,
wherein the PCB has a longitudinal dimension spanning at least approximately 75 percent of a longest dimension of the housing, wherein the PCB has a height spanning at least approximately 65 percent of a vertical height of the housing,
wherein the compliant cover fits over the core in a compliant manner to seal against all contact surfaces of the core; and
an electro-acoustic transducer contained in the housing for providing an acoustic output, and wherein the electro-acoustic transducer has a maximum excursion that occupies at least approximately 90 percent of a depth of the housing.

17. The portable loudspeaker of claim 16, wherein the rigid core is at least 15 percent harder than the compliant cover on a hardness scale, and wherein the rear enclosure defines a rear of the portable loudspeaker and approximately an entirety of sidewalls of the portable loudspeaker.

18. The portable loudspeaker of claim 16, wherein the compliant cover provides impact protection for components in the housing, the components including the electro-acoustic transducer.

19. The portable loudspeaker of claim 16, further comprising a mounting strap extending through the rear enclosure, wherein the compliant cover provides an environmental seal around the mounting strap.

* * * * *